US012607305B2

(12) United States Patent
Jeong et al.

(10) Patent No.: US 12,607,305 B2
(45) Date of Patent: Apr. 21, 2026

(54) HYDROGEN STORAGE THERMAL MANAGEMENT SYSTEM AND METHOD

(71) Applicants:HYUNDAI MOTOR COMPANY, Seoul (KR); KIA CORPORATION, Seoul (KR)

(72) Inventors: Ho Young Jeong, Daegu (KR); Yeon Ho Kim, Seoul (KR); Ji Hye Park, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 209 days.

(21) Appl. No.: 18/212,839

(22) Filed: Jun. 22, 2023

(65) Prior Publication Data

US 2024/0151366 A1     May 9, 2024

(30) Foreign Application Priority Data

Nov. 9, 2022     (KR) ........................ 10-2022-0148798

(51) Int. Cl.
*F17C 13/08*          (2006.01)
(52) U.S. Cl.
CPC ........ *F17C 13/08* (2013.01); *F17C 2221/012* (2013.01); *F17C 2227/0157* (2013.01); *F17C 2227/03* (2013.01); *Y02E 60/32* (2013.01)
(58) Field of Classification Search
CPC ............................... Y02E 60/32; F17C 11/005
(Continued)

(56) References Cited

U.S. PATENT DOCUMENTS 8,336,319 B2    12/2012  Johnston et al.
10,720,684 B2    7/2020  Kim
(Continued)

FOREIGN PATENT DOCUMENTS

CN          1532476 A      9/2004
CN      115295823 A  *  11/2022  .......... H01M 8/0432
(Continued)

OTHER PUBLICATIONS

Kumar, Alok, et al. 'Absorption based solid state hydrogen storage system: a review.' Sustainable Energy Technologies and Assessments 52, 2022. Elsevier [online] [retrieved on Jun. 8, 2025]. Retrieved from https://doi.org/10.1016/j.carbon.2005.11.015. (Year: 2022).*
(Continued)

*Primary Examiner* — Elizabeth J Martin
*Assistant Examiner* — Keona Lauren Banks
(74) *Attorney, Agent, or Firm* — Lempia Summerfield Katz LLC

(57)          ABSTRACT
A hydrogen supply method including a $(1\text{-}1)^{th}$ fluid circulation operation in which a first fluid sequentially circulates through a first fluid circulation line including a first heat exchanger in which the first fluid and an external fluid exchange heat therebetween, a first flow rate control member that controls flow of the first fluid, a compressor, the first flow rate control member, a second heat exchanger, and an expansion member. The hydrogen supply method further includes a $(2\text{-}1)^{th}$ fluid circulation operation in which a second fluid circulates through a second fluid circulation line through which the second fluid circulates and exchanges heat with the first fluid in the second heat exchanger.

17 Claims, 7 Drawing Sheets

(58) Field of Classification Search
USPC ....................................... 429/218.2; 420/900
See application file for complete search history.

(56)                    References Cited

U.S. PATENT DOCUMENTS

| | | | |
|---|---|---|---|
| 2002/0073617 A1* | 6/2002 | Ovshinsky ............ | F17C 11/005 |
| | | | 75/610 |
| 2005/0139493 A1* | 6/2005 | Myasnikov ............ | B01D 53/02 |
| | | | 206/0.7 |
| 2007/0289882 A1* | 12/2007 | Myasnikov ............ | B60L 58/33 |
| | | | 206/0.6 |
| 2019/0165438 A1* | 5/2019 | Kim .................... | H01M 10/615 |
| 2024/0151360 A1 | 5/2024 | Jeong | |
| 2024/0151361 A1 | 5/2024 | Kim | |

FOREIGN PATENT DOCUMENTS

| | | | |
|---|---|---|---|
| JP | H0316594 | B2 | 3/1991 |
| JP | 2004190983 | A | 7/2004 |
| KR | 20120083049 | A | 7/2012 |
| KR | 20190064057 | A | 6/2019 |
| KR | 102415622 | B1 | 7/2022 |
| KR | 20240067598 | A | 5/2024 |
| KR | 20240067599 | A | 5/2024 |
| WO | 2010087723 | A1 | 8/2010 |
| WO | 2018122083 | A1 | 7/2018 |

OTHER PUBLICATIONS

Li et al. (CN115295823A) English Translation (Year: 2022).*

* cited by examiner

10

10

HYDROGEN STORAGE THERMAL MANAGEMENT SYSTEM AND METHOD

CROSS-REFERENCE TO RELATED APPLICATION

This application claims the benefit of priority to Korean Patent Application No. 10-2022-0148798, filed in the Korean Intellectual Property Office on Nov. 9, 2022, the entire contents of which are incorporated herein by reference.

TECHNICAL FIELD

The present disclosure relates to a hydrogen supply module and a hydrogen supply method, and more particularly, to a hydrogen supply module and a hydrogen supply method that may store hydrogen and supply the stored hydrogen to a demand part.

BACKGROUND

In recent years, due to climate change or the like, the demand for clean energy sources that may replace existing energy sources is rapidly increasing. Hydrogen is being spotlighted as one of these clean energy sources. In order to use hydrogen as an energy source, a technology of producing hydrogen, storing the hydrogen, and then supplying the hydrogen to a demand source is important.

According to the related art, in the case of a hydrogen storage system, a method of compressing gaseous hydrogen using a compressor driven by electric energy, then storing the hydrogen, and supplying the hydrogen to a demand part requiring the hydrogen is general.

However, in the case of a system according to the related art, it is necessary to compress the hydrogen at high pressure due to the nature of hydrogen having a significantly large volume compared to other gases. Thus, in the case of the hydrogen storage system according to the related art, a method of compressing hydrogen through multi-stage compression and storing the compressed hydrogen has been widely used. However, the electrical energy required to store the hydrogen is excessive as is the cost of maintaining such a system.

SUMMARY

The present disclosure has been made to solve the above-mentioned problems occurring in the prior art while advantages achieved by the prior art are maintained intact.

An aspect of the present disclosure provides a novel hydrogen storage system that may replace a hydrogen storage system that directly compresses hydrogen.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, there is provided a hydrogen supply module including a first fluid circulation device including a first fluid circulation line through which a first fluid circulates. The hydrogen supply module further includes a second fluid circulation device including a second fluid circulation line through which a second fluid circulates. The first fluid circulation device further includes: a first heat exchanger by which the first fluid and an external fluid exchange heat therebetween; a first flow rate control member that is connected to the first heat exchanger through the first fluid circulation line and controls flow of the first fluid; a compressor that is connected to the first flow rate control member through the first fluid circulation line and compresses the first fluid; a second heat exchanger connected to the first flow rate control member through the first fluid circulation line; and an expansion member that is connected to the second heat exchanger through the first fluid circulation line and expands the first fluid. The second fluid circulation line is connected to the second heat exchanger so that the first fluid and the second fluid exchange heat therebetween in the second heat exchanger. The second fluid circulation device further includes a pump that is connected to the second heat exchanger through the second fluid circulation line and pumps the second fluid, and a hydrogen storage connected to the second heat exchanger through the second fluid circulation line and including a metal or alloy that adsorbs hydrogen.

A first side and a second side of the first flow rate control member may be connected to the compressor through the first fluid circulation line. The first fluid circulation device may be provided such that the first fluid either: sequentially passes through the first flow rate control member, the compressor, the first flow rate control member, and the second heat exchanger; or sequentially passes through the first flow rate control member, the compressor, the first flow rate control member, and the first heat exchanger.

The second fluid circulation device may be provided such that the second fluid sequentially passes through the second heat exchanger, the hydrogen storage, and the pump.

The second fluid circulation device may further include a thermal device that is provided on the second fluid circulation line and heats or cools the second fluid.

The thermal device may be a heat dissipation member that cools the second fluid or a heating member that heats the second fluid.

The second fluid circulation device may further include a second flow rate control member that is provided on a downstream region of the pump in the second fluid circulation line and to which the second fluid discharged from the pump is supplied. The second fluid circulation line may branch into an area connected to the second heat exchanger and an area connected to the thermal device with respect to the second flow rate control member. The second flow rate control member may control a flow rate of the second fluid supplied to the second heat exchanger and a flow rate of the second fluid supplied to the thermal device.

According to another aspect of the present disclosure, there is provided a hydrogen supply method including a $(1\text{-}1)^{th}$ fluid circulation operation in which a first fluid sequentially circulates through a first fluid circulation line including a first heat exchanger, a first flow rate control member that controls flow of the first fluid, a compressor, the first flow rate control member, a second heat exchanger, and an expansion member. The hydrogen supply method further includes a $(2\text{-}1)^{th}$ fluid circulation operation in which a second fluid circulates through a second fluid circulation line through which the second fluid circulates and exchanges heat with the first fluid in the second heat exchanger. The $(2\text{-}1)^{th}$ fluid circulation operation includes allowing the second fluid to sequentially circulate through the second heat exchanger, a hydrogen storage including a metal or alloy that adsorbs hydrogen, and a pump through the second fluid circulation line.

3

The $(2\text{-}1)^{th}$ fluid circulation operation may further include heating or cooling the second fluid discharged from the second heat exchanger in a thermal device before flowing into the hydrogen storage.

The hydrogen supply method may further include a $(1\text{-}2)^{th}$ fluid circulation operation in which the first fluid sequentially circulates through the first heat exchanger, the expansion member, the second heat exchanger, the first flow rate control member, the compressor, and the first flow rate control member through the first fluid circulation line. The $(1\text{-}1)^{th}$ fluid circulation operation and the $(1\text{-}2)^{th}$ fluid circulation operation are performed separately from each other in time series (i.e., asynchronously).

The hydrogen supply method may further include a $(2\text{-}2)^{th}$ fluid circulation operation in which the second fluid circulates through the second fluid circulation line and bypasses the second heat exchanger. The $(2\text{-}2)^{th}$ fluid circulation operation may further include allowing the second fluid to sequentially circulate through the hydrogen storage, the pump, and a thermal device that heats or cools the second fluid through the second fluid circulation line.

The $(2\text{-}1)^{th}$ fluid circulation operation and the $(2\text{-}2)^{th}$ fluid circulation operation may be performed separately from each other in time series.

The $(2\text{-}1)^{th}$ fluid circulation operation and the $(2\text{-}2)^{th}$ fluid circulation operation may be performed while overlapping each other in time series (i.e., synchronously).

The hydrogen supply method may further include: a hydrogen absorption operation in which the second fluid flows into the hydrogen storage to cool the metal or alloy to absorb the hydrogen to the metal or alloy in the hydrogen storage to form a hydride; and a hydrogen storage heating operation that is performed after the hydrogen adsorption operation and in which the second fluid flows into the hydrogen storage to heat the hydrogen storage.

The hydrogen supply method may further include a hydrogen desorption operation that is performed after the hydrogen storage heating operation and in which the second fluid flows into the hydrogen storage to heat the hydride to desorb the hydrogen from the hydride in the hydrogen storage. The hydrogen supply method may further include a hydrogen storage cooling operation which is performed after the hydrogen desorption operation and in which the second fluid flows into the hydrogen storage to cool the hydrogen storage.

In the hydrogen absorption operation, the amount of the hydrogen in the hydrogen storage may increase.

In the hydrogen storage heating operation, a temperature of the hydrogen storage may increase, and the amount of the hydrogen in the hydrogen storage may be constant.

In the hydrogen desorption operation, the amount of the hydrogen in the hydrogen storage may decrease.

In the hydrogen storage cooling operation, a temperature of the hydrogen storage may decrease, and the amount of hydrogen in the hydrogen storage may be constant.

In the hydrogen absorption operation, the second fluid flowing into the hydrogen storage may exchange heat with the first fluid circulating in the $(1\text{-}2)^{th}$ fluid circulation operation in the second heat exchanger and then flow into the hydrogen storage. In the hydrogen storage heating operation, the second fluid flowing into the hydrogen storage may exchange heat with the first fluid circulating in the $(1\text{-}1)^{th}$ fluid circulation operation in the second heat exchanger and then flow into the hydrogen storage.

In the hydrogen desorption operation, the second fluid flowing into the hydrogen storage may exchange heat with the first fluid circulating in the $(1\text{-}1)^{th}$ fluid circulation

4 operation in the second heat exchanger and then flow into the hydrogen storage. In the hydrogen storage cooling operation, the second fluid flowing into the hydrogen storage may exchanges heat with the first fluid circulating in the $(1\text{-}2)^{th}$ fluid circulation operation in the second heat exchanger and then flow into the hydrogen storage.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

When a component, device, element, or the like, of the present disclosure is described as having a purpose or performing an operation, function, or the like, the component, device, or element should be considered herein as being "configured to" meet that purpose or to perform that operation or function.

A hydrogen supply module and a hydrogen supply method according to the present disclosure may be intended to replace a hydrogen supply system according to the related art, which compresses gaseous hydrogen using a compressor driven by electric energy, then stores the hydrogen, and supplies the hydrogen to a demand part requiring the hydrogen.

In particular, according to the present disclosure, using a property of a metal or alloy that may adsorb and desorb the hydrogen, the hydrogen may be adsorbed to the metal or alloy, stored in the form of a hydride, desorbed from the hydride, and supplied to a demand part for the hydrogen. Representative examples of the hydride formed by adsorbing the hydrogen on the metal or alloy include magnesium hydride ($MgH_2$), lithium hydride (LiH), lithium aluminum hydride ($LiAlH_4$), sodium borohydride ($NaBH_4$), sodium aluminum hydride ($NaAlH_4$), and the like, but the hydride described in the present disclosure is not limited thereto.

Since the desorption of the hydrogen occurring in the hydride and the absorption of the hydrogen occurring in the metal or alloy are caused by a change in a temperature and pressure of the hydride and a change in a temperature and pressure of the metal or alloy, the hydrogen supply module and the hydrogen supply method according to the present disclosure are closely related to a method of transferring thermal energy to allow the desorption and absorption of the hydrogen to occur. In other words, since a process of absorbing the hydrogen to the metal or alloy is an exothermic process, it is necessary to recover thermal energy occurring in the process of absorbing the hydrogen and discharge the recovered thermal energy to the outside to smoothly absorb the hydrogen to the metal or alloy. Further, since a process of desorbing the hydrogen from the hydride is an endothermic process, it is necessary to supply thermal energy required for the process of desorbing the hydrogen to the hydride to smoothly desorb the hydrogen from the hydride. The hydrogen supply module and the hydrogen supply method according to the present disclosure may be intended to adjust a temperature and pressure of the hydride and the metal or alloy by smoothing moving the thermal energy required in the above-described process of absorbing and desorbing the hydrogen.

Hereinafter, the hydrogen supply module and the hydrogen supply method according to the present disclosure are described with reference to the accompanying drawings.

Hydrogen Supply Module

Figure 1:
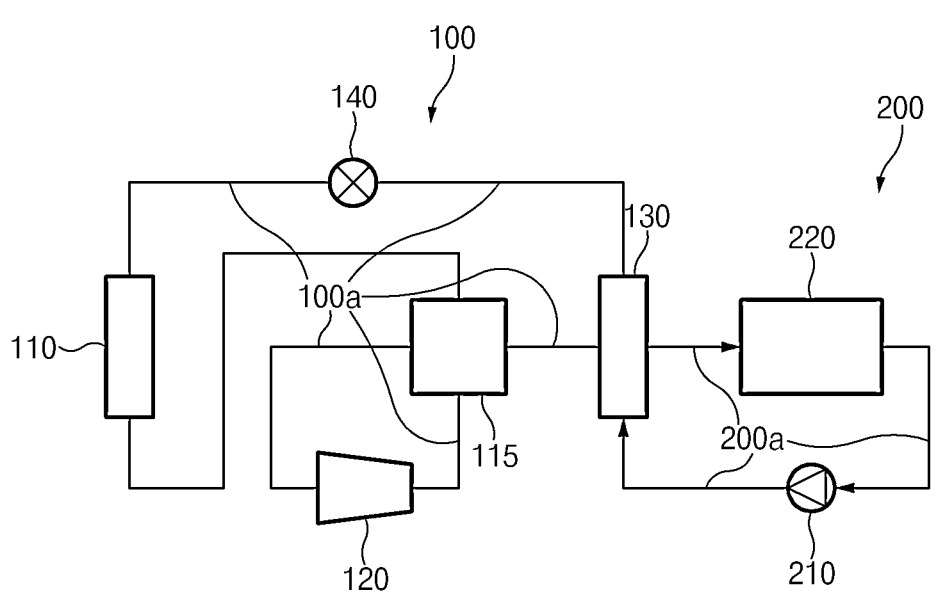
FIG. 1 is a view illustrating a hydrogen supply module according to a first embodiment of the present disclosure.

FIG. 1 is a view illustrating a hydrogen supply module according to a first embodiment of the present disclosure.

Referring to FIG. 1, the hydrogen supply module according to the present disclosure may include a first fluid circulation device 100 including a first fluid circulation line 100a through which a first fluid circulates and a second fluid circulation device 200 including a second fluid circulation line 200a through which a second fluid circulates. As described below, the first fluid circulating through the first fluid circulation device 100 may exchange heat with the outside, the second fluid circulating through the second fluid circulation device 200 may exchange heat with the above-described first fluid, and the second fluid may finally exchange heat with hydrogen storage. As an example, the first fluid may be a refrigerant used in a refrigeration cycle, and the second fluid may be cooling water. However, the types of the first fluid and the second fluid are not limited to the above description.

The first fluid circulation device 100 may include a first heat exchanger 110 through which heat is exchanged between the first fluid and an external fluid. The first heat exchanger 110 may be configured to exchange heat with the external fluid to heat or cool the first fluid. For example, the first heat exchanger 110 may be an evaporator.

According to the present disclosure, the first fluid circulation device 100 may further include a first flow rate control member 115 connected to the first heat exchanger 110 through the first fluid circulation line 100a and configured to control flow of the first fluid. The first flow rate control member 115 may be a valve member that may control a flow direction of the first fluid. For example, the first flow rate control member 115 may be a four-way valve. As described below, according to the present disclosure, the flow direction of the first fluid circulating through the first fluid circulation line 100a may be configured to change, and the first flow rate control member 115 may control the flow of the first fluid to change the flow direction of the first fluid flowing through the first fluid circulation line 100a. The first fluid circulation device 100 may further include a compressor 120 connected to the first flow rate control member 115 through the first fluid circulation line 100a and configured to compress the first fluid. The compressor 120 may be configured to increase a pressure and temperature of the first fluid by compressing the first fluid flowing in a gas state, and the first flow rate control member 115 may be configured to control the flow direction of the first fluid supplied from the compressor 120. In the present specification, it may be understood that a state in which two components are connected through the first fluid circulation line 100a or the second fluid circulation line 200a not only means a state in which the two components are directly connected through the first fluid circulation line 100a or the second fluid circulation line 200a but also means a state in which the two components are indirectly connected with another component provided between the first fluid circulation line 100a and the second fluid circulation line 200a. As an example, FIG. 1 illustrates a state in which the first heat exchanger 110 and the first flow rate control member 115 are directly connected through the first fluid circulation line 100a and the first flow rate control member 115 and the compressor 120 are directly connected.

The first fluid circulation device 100 may further include a second heat exchanger 130 connected to the first flow rate control member 115 through the first fluid circulation line 100a and an expansion member 140 connected to the second heat exchanger 130 through the first fluid circulation line 100a and configured to expand the first fluid. The expansion member 140 may be an expansion valve. As an example, FIG. 1 illustrates a state in which the first flow rate control member 115 and the second heat exchanger 130 are directly connected through the first fluid circulation line 100a, and the second heat exchanger 130 and the expansion member 140 are directly connected.

The first fluid circulation line 100a may have a closed loop shape in which the first heat exchanger 110, the first flow rate control member 115, the compressor 120, the second heat exchanger 130, and the expansion member 140 are connected. Thus, the first fluid flowing through the first fluid circulation line 100a may repeatedly circulate through the first heat exchanger 110, the first flow rate control member 115, the compressor 120, the second heat exchanger 130, and the expansion member 140. As described above, according to the present disclosure, a plurality of flow directions of the first fluid may be formed through controlling the first flow rate control member 115.

The second heat exchanger 130 may be configured to exchange heat between the first fluid and the second fluid. To achieve the above objective, the second fluid circulation line 200a may be connected to the second heat exchanger 130, and the first fluid and the second fluid may exchange heat in the second heat exchanger 130. As described below, according to the present disclosure, in the second heat exchanger 130, the first fluid and the second fluid may exchange heat therebetween so that the second fluid may be heated and the first fluid may be cooled. On the contrary, in the second heat exchanger 130, the first fluid and the second fluid may exchange heat therebetween so that the second fluid may be cooled and the first fluid may be heated.

The second fluid circulation device 200 may further include: a pump 210 connected to the second heat exchanger 130 through the second fluid circulation line 200a and configured to pump the second fluid in a liquid state; and a hydrogen storage 220 connected to the second heat exchanger 130 through the second fluid circulation line 200a. According to a first embodiment of the present disclosure, the second fluid pumped by the pump 210 may be supplied to the second heat exchanger 130, may exchange heat with the first fluid, and may then be supplied to the hydrogen storage 220. Similar to the first fluid circulation line 100*a*, the second fluid circulation line 200*a* may have a closed loop shape in which the second heat exchanger 130, the hydrogen storage 220, and the pump 210 are sequentially connected. Thus, the second fluid flowing through the second fluid circulation line 200*a* may repeatedly circulate through the second heat exchanger 130, the hydrogen storage 220, and the pump 210. As an example, FIG. 1 illustrates a state in which the second heat exchanger 130 and the hydrogen storage 220 are directly connected through the second fluid circulation line 200*a*, the hydrogen storage 220 and the pump 210 are directly connected through the second fluid circulation line 200*a*, and the pump 210 and the second heat exchanger 130 are directly connected through the second fluid circulation line 200*a*.

According to the present disclosure, the hydrogen storage 220 may be configured to store and discharge the hydrogen according to a temperature. The hydrogen storage 220 may include metal or alloy that may adsorb the hydrogen. In other words, the metal or alloy provided in the hydrogen storage 220 according to the present disclosure is a material to which the hydrogen may be coupled, and according to a temperature, the hydrogen may be adsorbed to form a hydride. In contrast, the hydrogen may be desorbed from the hydride so that the hydride is converted into a metal or alloy state again.

A process of absorbing the hydrogen to the metal or alloy may be an exothermic process, and a process of desorbing the hydrogen from the hydride may be an endothermic process. Thus, it is necessary to recover thermal energy from the metal or alloy to absorb the hydrogen to the metal or alloy, and it is necessary to supply thermal energy to the hydride to desorb the hydrogen from the hydride. According to the present disclosure, the thermal energy may be recovered from the metal or alloy or the thermal energy may be supplied to the hydride through the second fluid supplied to the hydrogen storage 220 including the metal or alloy. Accordingly, the absorption and desorption of the hydrogen may be controlled.

According to the present disclosure based on the above description, when the hydrogen is adsorbed to the metal or alloy, the hydrogen storage 220 may function to store the hydrogen, and when the hydrogen is desorbed from the hydride, the hydrogen storage 220 may function to supply the hydrogen to the outside. Thus, the hydrogen storage system according to the related art, in which hydrogen is stored in a container and the hydrogen is supplied to the outside using a compressor, may be replaced.

According to the first embodiment of the present disclosure, the second fluid may be provided to circulate inside the second fluid circulation device 200 in one direction. Referring to FIG. 1, the second fluid circulation device 200 may be provided such that the second fluid sequentially passes through the second heat exchanger 130, the hydrogen storage 220, and the pump 210 through the second fluid circulation line 200*a*. The second fluid passing through the pump 210 may be supplied to the second heat exchanger 130 again.

On the other hand, according to the present disclosure, the first fluid may be provided to circulate inside the first fluid circulation device 100 in two directions. As illustrated in FIG. 1, a first side of the first flow rate control member 115 and a second side spaced apart from the first side may be connected to the compressor 120 through the first fluid circulation line 100*a*. The first fluid circulation device 100 may be provided such that the first fluid selectively: sequentially passes through the first flow rate control member 115, the compressor 120, the first flow rate control member 115, and the second heat exchanger 130 (i.e., first path of first fluid, or (1-1)$^{th}$ fluid circulation path); or sequentially passes through the first flow rate control member 115, the compressor 120, the first flow rate control member 115, and the first heat exchanger 110 (i.e., second path of first fluid, or (1-2)$^{th}$ fluid circulation path). As described above, according to the present disclosure, when the first fluid flows along the (1-1)$^{th}$ fluid circulation path, the second fluid is heated by the first fluid, and when the first fluid flows along the (1-2)$^{th}$ fluid circulation path, the second fluid may be cooled by the first fluid.

Figure 2:
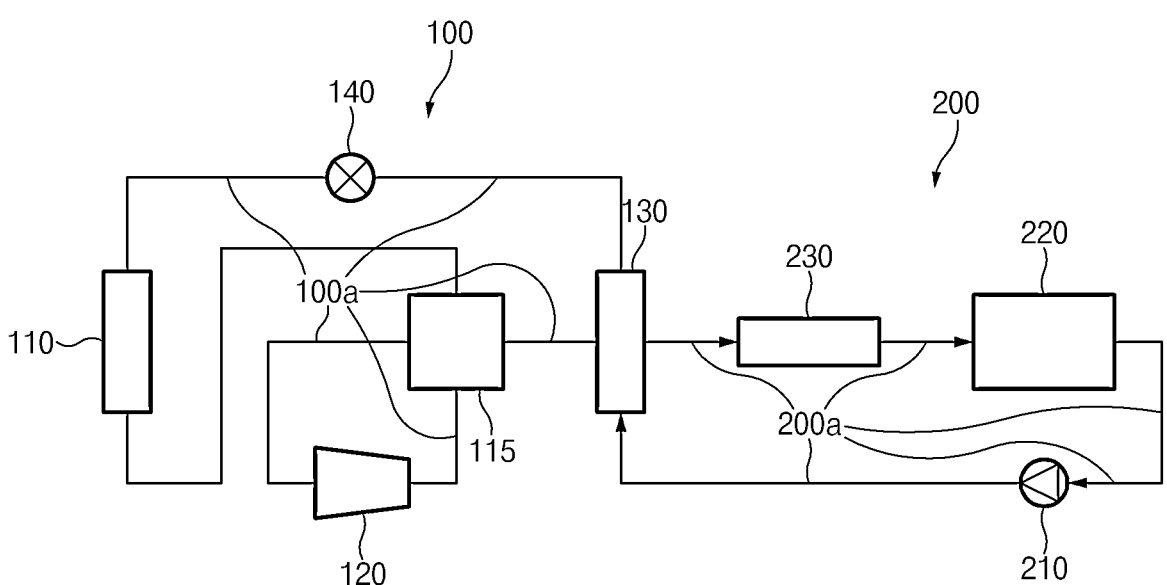
FIG. 2 is a view illustrating a hydrogen supply module according to a second embodiment of the present disclosure.

FIG. 2 is a view illustrating a hydrogen supply module according to a second embodiment of the present disclosure.

The hydrogen supply module 10, according to the second embodiment of the present disclosure, differs from the hydrogen supply module 10 according to the first embodiment of the present disclosure described above with reference to FIG. 1 in that the former further includes a thermal device 230. Hereinafter, the second embodiment of the present disclosure is described while focusing on differences from the first embodiment of the present disclosure. Except for the following contents, the contents of the first embodiment of the present disclosure may be equally applied to the second embodiment of the present disclosure.

According to a second embodiment of the present disclosure, the second fluid circulation device 200 may further include the thermal device 230 provided on the second fluid circulation line 200*a* and configured to heat or cool the second fluid. For example, as illustrated in FIG. 2, the thermal device 230 may be provided in an upstream area of the hydrogen storage 220 in the second fluid circulation line 200*a* and may heat or cool the second fluid before the second fluid is supplied to the hydrogen storage 220. A state in which the thermal device 230 is provided in the upstream area of the hydrogen storage 220 may be understood as a state in which the second fluid passes through the thermal device 230 and is then supplied to the hydrogen storage 220. When the thermal device 230 is configured to heat the second fluid, the thermal device 230 may be a heating member such as an electric heater, a gas heater, or a thermoelectric element. When the thermal device 230 is configured to cool the second fluid, the thermal device 230 may be a heat dissipation member such as a radiator. The thermal device 230 may be provided in an area between the second heat exchanger 130 and the hydrogen storage 220 in the second fluid circulation line 200*a*.

As in the second embodiment of the present disclosure, when the thermal device 230 is additionally provided, the hydrogen may be smoothly desorbed and absorbed by the heat exchange between the second fluid and the hydrogen storage 220. In other words, when the thermal device 230 is provided as a heat dissipation member, the second fluid may be cooled by the thermal device 230, and then supplied to the hydrogen storage 220, and the absorption of the hydrogen, which is an exothermic reaction, may be more smoothly performed. Thus, the hydrogen may be more smoothly stored in the hydrogen storage 220. In contrast, when the thermal device 230 is provided as a heating member, the second fluid may be heated by the thermal device 230 and then supplied to the hydrogen storage 220, and the desorption of the hydrogen, which is an endothermic reaction, may be more smoothly performed. Thus, the hydrogen may be more smoothly discharged from the hydrogen storage 220.

9

Figure 3:
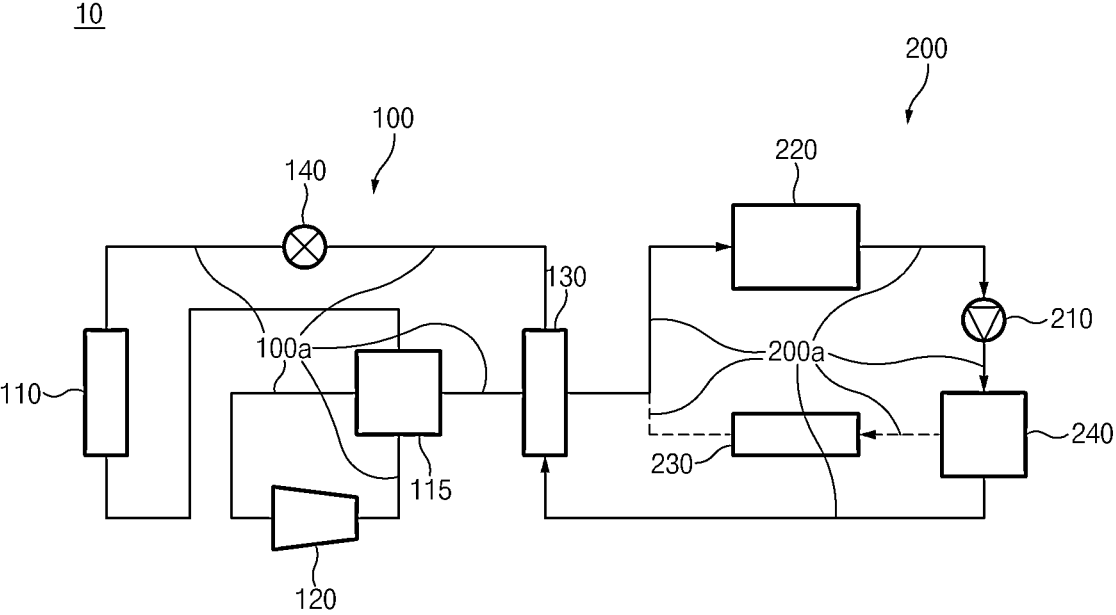
FIG. 3 is a view illustrating a fluid circulation path when a second fluid is supplied from a second flow rate control member to a second heat exchanger, as a hydrogen supply module according to a third embodiment of the present disclosure.
Figure 4:
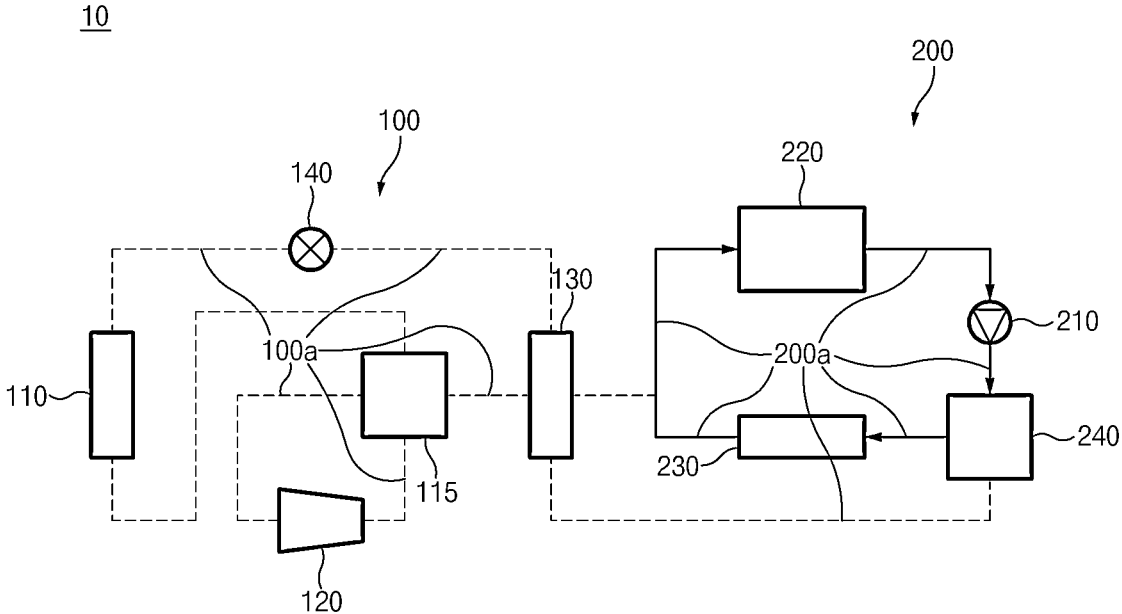
FIG. 4 is a view illustrating the fluid circulation path when the second fluid is supplied from a second flow rate control member to a thermal device, as a hydrogen supply module according to the third embodiment of the present disclosure.

FIG. 3 is a view illustrating a fluid circulation path when a second fluid is supplied from a second flow rate control member to a second heat exchanger, as a hydrogen supply module according to a third embodiment of the present disclosure, and FIG. 4 is a view illustrating the fluid circulation path when the second fluid is supplied from a second flow rate control member to a thermal device, as a hydrogen supply module according to the third embodiment of the present disclosure.

The hydrogen supply module 10 according to the third embodiment of the present disclosure differs from the hydrogen supply module 10 according to the first embodiment and the second embodiment of the present disclosure, which is described above with reference to FIGS. 1 and 2, in that the former further includes a second flow rate control member 240. Hereinafter, the third embodiment of the present disclosure is described while focusing on differences from the first embodiment and the second embodiment of the present disclosure. Except for the following contents, the contents of the first embodiment and the second embodiment of the present disclosure may be equally applied to the third embodiment of the present disclosure.

According to the third embodiment of the present disclosure, the second fluid circulation device 200 may further include the second flow rate control member 240 which is provided on a downstream area of the pump 210 in the second fluid circulation line 200a and to which the second fluid discharged from the pump 210 is supplied. The second flow rate control member 240 may be a valve member that may control a flow direction of the second fluid. For example, the second flow rate control member 240 may be a three-way valve.

As illustrated in FIGS. 3 and 4, according to the third embodiment of the present disclosure, the second fluid circulation line 200a may branch into an area connected to the second heat exchanger 130 and an area connected to the thermal device 230 with respect to the second flow rate control member 240. It may be understood that, according to the third embodiment of the present disclosure, i) an area of the second fluid circulation line 200a, which connects the second flow rate control member 240 and the second heat exchanger 130 (i.e., a first area), and ii) an area of the second fluid circulation line 200a, which connects the second flow rate control member 240 and the thermal device 230 (i.e., a second area), may be parallel with each other. According to the third embodiment of the present disclosure, the second flow rate control member 240 may control a flow rate of the second fluid supplied to the second heat exchanger 130 and a flow rate of the second fluid supplied to the thermal device 230. Thus, according to the third embodiment of the present disclosure, the second fluid supplied from the second flow rate control member 240 to the first area may be directly supplied to the second heat exchanger 130 without passing through the thermal device 230, and the second fluid supplied from the second flow rate control member 240 to the second area may be heated or cooled through the thermal device 230 and then supplied to the hydrogen storage 220.

As compared to the first embodiment and the second embodiment of the present disclosure, according to the third embodiment of the present disclosure, since the second fluid may pass through the thermal device 230 or, in contrast, may bypass the thermal device 230, the temperature of the second fluid may be controlled more diversely.

The hydrogen supply module 10 according to the present disclosure may further include a gas-liquid separator that removes a liquid component from the first fluid and separates the liquid component from the gas. The gas-liquid separator may be provided in an area in which the first fluid is supplied from the first flow rate control member 115 to the compressor 120 among an area of the first fluid circulation line 100a, which connects the first flow rate control member 115 and the compressor 120. This may be configured to minimize damage to the compressor 120 by supplying only the gaseous first fluid to the compressor 120.

Further, the hydrogen supply module 10 according to the present disclosure may further include a receiver-dryer that removes a gaseous component from the first fluid and separates the gaseous component from the liquid. The receiver-dryer may be provided in an area between the second heat exchanger 130 and the expansion member 140 in the first fluid circulation line 100a. This may be for supplying only the liquid first fluid to the expansion member 140. However, only the liquid first fluid may be supplied to the expansion member 140 without the receiver-dryer depending on performance of the first heat exchanger 110 and the second heat exchanger 130, and in this case, the receiver-dryer may not be required.

The hydrogen supply module 10 according to the present disclosure may further include a reservoir that collects a gaseous component from the second fluid and separates the gaseous component from the liquid. The reservoir may be configured to allow the second fluid to circulate on the second fluid circulation line 200a only in a liquid state. The reservoir may be provided on the second fluid circulation line 200a, and when the second fluid flowing through the second fluid circulation line 200a flows into the reservoir, the gaseous component in the second fluid in the reservoir may move upward due to a density difference between the gaseous component of the second fluid and the liquid component of the second fluid. The reservoir may collect the gaseous component of the second fluid moving upward, to allow only the liquid component of the second fluid to flow through the second fluid circulation line 200a. The reservoir may be provided at various positions on the second fluid circulation line 200a, but as an example, the reservoir may be provided at an uppermost area of the second fluid circulation line 200a to effectively collect the gaseous component in the second fluid.

Hydrogen Supply Method

Hereinafter, a hydrogen supply method according to the present disclosure is described with reference to the accompanying drawings and the above contents.

Figure 5:
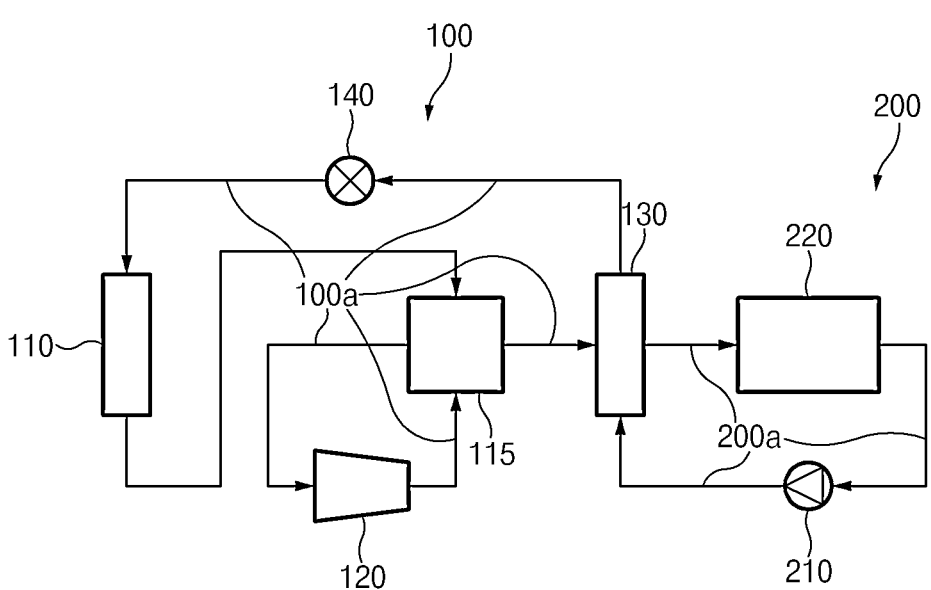
FIG. 5 is a view illustrating the fluid circulation path when a first fluid circulates by a $(1\text{-}1)^{th}$ fluid circulation operation in a hydrogen supply method according to the present disclosure.
Figure 6:
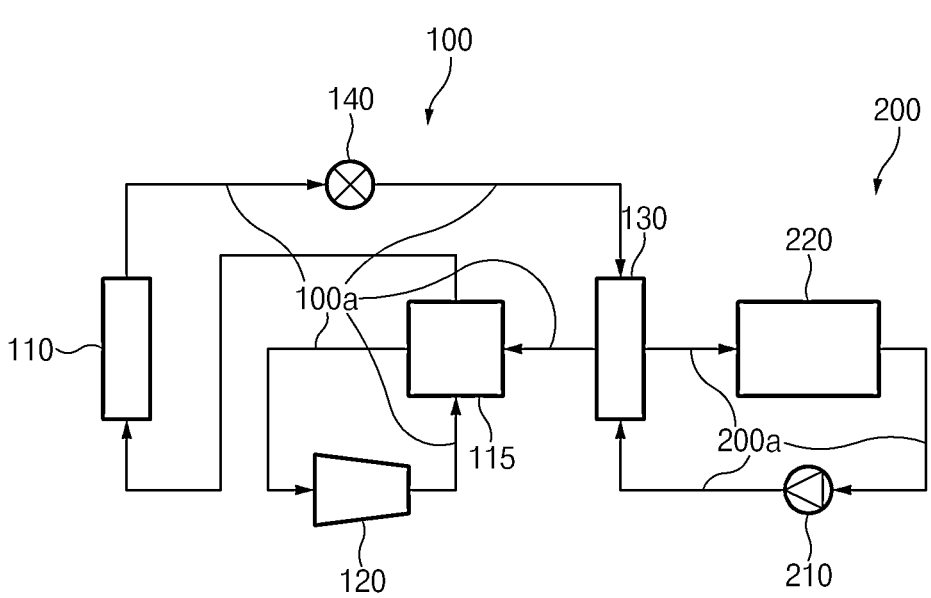
FIG. 6 is a view illustrating the fluid circulation path when the first fluid circulates by a $(1\text{-}2)^{th}$ fluid circulation operation in the hydrogen supply method according to the present disclosure.

FIG. 5 is a view illustrating the fluid circulation path when a first fluid circulates by a $(1\text{-}1)^{th}$ fluid circulation operation in a hydrogen supply method according to the present disclosure. FIG. 6 is a view illustrating the fluid circulation path when the first fluid circulates by a $(1\text{-}2)^{th}$ fluid circulation operation in the hydrogen supply method according to the present disclosure.

The hydrogen supply method according to the present disclosure may include a $(1\text{-}1)^{th}$ fluid circulation operation in which the first fluid sequentially circulates in: the first heat exchanger 110; the first flow rate control member 115 that controls the flow of the first fluid; the compressor 120; the first flow rate control member 115; the second heat exchanger 130; and the expansion member 140 through the first fluid circulation line 100a in which the first fluid circulates. The hydrogen supply method may further include a $(2\text{-}1)^{th}$ fluid circulation operation (i.e., a first path of the second fluid) in which the second fluid circulates through the second fluid circulation line 200a in which the second fluid circulates, and exchanges heat with the first fluid in the second heat exchanger 130. One side of the second fluid circulation line 200a may be connected to the second heat exchanger 130. The $(1-1)^{th}$ fluid circulation operation described above may be understood as a process in which the first fluid circulates through the first fluid circulation line 100a as illustrated in FIGS. 2, 3, and 5.

The $(2-1)^{th}$ fluid circulation operation described above may include allowing the second fluid to sequentially circulate in the second heat exchanger 130, the hydrogen storage 220 including metal or alloy that may adsorb hydrogen, and the pump 210 through the second fluid circulation line 200a. This may be understood as a process in which the second fluid flows along an area of the second fluid circulation line 200a, which is indicated by a solid line, in FIGS. 1 and 3.

As described above, since the compressor 120 compresses the first fluid, the pressure and temperature of the first fluid increase. According to the present disclosure, in the $(1-1)^{th}$ fluid circulation operation, the first fluid compressed by the compressor 120 flows into the second heat exchanger 130 via the first flow rate control member 115, and in the second heat exchanger 130, the first fluid having a relatively high temperature exchanges heat with the second fluid having a relatively low temperature. Thus, in the second heat exchanger 130, the temperature of the first fluid decreases, and the temperature of the second fluid increases. The first fluid discharged from the second heat exchanger 130 may be cooled while being expanded in the expansion member 140, heated in the first heat exchanger 110, and then supplied to the compressor 120 again via the first flow rate control member 115.

Further, in the $(2-1)^{th}$ fluid circulation operation, the second fluid that exchanges heat with the first fluid circulating in the $(1-1)^{th}$ fluid circulation operation described above is supplied to the hydrogen storage 220. The second fluid supplies thermal energy to the hydrogen storage 220. Since the desorption reaction of the hydrogen, which is an endothermic reaction, occurs in the hydride in the hydrogen storage 220 receiving the thermal energy, the hydrogen storage 220 may supply the hydrogen to an external demand part.

According to the present disclosure, the $(2-1)^{th}$ fluid circulation operation described above may include heating or cooling the second fluid, which is discharged from the second heat exchanger 130, in the thermal device 230 before the second fluid flows into the hydrogen storage 220. This may be understood as a process in which the second fluid flows along an area of the second fluid circulation line 200a, which is indicated by a solid line, in FIG. 2. In the $(2-1)^{th}$ fluid circulation operation, when the second fluid is heated by the thermal device 230, since more thermal energy may be applied to the hydrogen storage 220, a greater desorption reaction of the hydrogen may occur, and thus more hydrogen may be supplied to the outside. In contrast, when the second fluid is cooled by the thermal device 230, since the low-temperature second fluid may be supplied to the hydrogen storage 220, in contrast to the above description, the thermal energy may be recovered from the hydrogen storage 220 through the heat exchange with the hydrogen storage 220. Since the absorption reaction of the hydrogen, which is an exothermic reaction, occurs in the metal or alloy in the hydrogen storage 220, the hydrogen storage 220 may receive and store the hydrogen supplied from the outside.

Further, the hydrogen supply method according to the present disclosure may further include the $(1-2)^{th}$ fluid circulation operation in which the first fluid sequentially circulates in the first heat exchanger 110, the expansion member 140, the second heat exchanger 130, the first flow rate control member 115, the compressor 120, and the first flow rate control member 115 through the first fluid circulation line 100a. This may be understood as a process in which the first fluid flows along the first fluid circulation line 100a in FIG. 6. In comparison between FIGS. 5 and 6, the flowing direction of the first fluid in the $(1-2)^{th}$ fluid circulation operation is opposite to the flowing direction of the first fluid in the $(1-1)^{th}$ fluid circulation operation. Thus, according to the present disclosure, the $(1-1)^{th}$ fluid circulation operation and the $(1-2)^{th}$ fluid circulation operation may be performed separately from each other in time series. This may be understood that the $(1-1)^{th}$ fluid circulation operation and the $(1-2)^{th}$ fluid circulation operation are alternatively performed.

Unlike the $(1-1)^{th}$ fluid circulation operation, the $(1-2)^{th}$ fluid circulation operation may be configured to cool the second fluid when the first fluid and the second fluid exchange heat therebetween. Referring to FIG. 6, when the first fluid flowing by the $(1-2)^{th}$ fluid circulation operation and the second fluid flowing by the $(2-1)^{th}$ fluid circulation operation exchange heat therebetween in the second heat exchanger 130, the first fluid having a relatively low temperature may be heated while receiving the thermal energy from the second fluid, and the second fluid may be cooled while transferring the thermal energy to the first fluid. Thus, the second fluid discharged from the second heat exchanger 130 may be supplied to the hydrogen storage 220 to recover the thermal energy from the hydrogen storage 220 and the metal or alloy in the hydrogen storage 220. The absorption reaction of the hydrogen, which is an exothermic reaction, may smoothly occur in the metal or alloy. According to the present disclosure, when the second fluid flows through the $(2-1)^{th}$ fluid circulation operation, the second fluid circulating by the $(2-1)^{th}$ fluid circulation operation may be heated or cooled in the second heat exchanger 130 according to whether the first fluid flows by the $(1-1)^{th}$ fluid circulation operation or by the $(1-2)^{th}$ fluid circulation operation.

The hydrogen supply method according to the present disclosure may further include a $(2-2)^{th}$ fluid circulation operation (i.e., a second path of the second fluid) in which the second fluid circulates through the second fluid circulation line 200a and bypasses the second heat exchanger 130. Thus, in the $(2-2)^{th}$ fluid circulation operation, the second fluid may circulate through the second fluid circulation line 200a while being thermally isolated from the first fluid. A state in which second fluid is thermally isolated from the first fluid may be understood as a state in which the second fluid circulates through the second fluid circulation line 200a without flowing into the second heat exchanger 130 and thus does not exchange heat with the first fluid. Thus, while the $(2-2)^{th}$ fluid circulation operation is performed, the $(1-1)^{th}$ fluid circulation operation and the $(1-2)^{th}$ fluid circulation operation as described above may not be performed. The $(2-2)^{th}$ fluid circulation operation may be understood as a process in which the second fluid flows along an area of the second fluid circulation line 200a, which is indicated by a solid line, in FIG. 4, and a state in which the $(1-1)^{th}$ fluid circulation operation and the $(1-2)^{th}$ fluid circulation operation are not performed may be understood as a state in which, in FIG. 4, the compressor 120 is not driven, and thus the first fluid does not substantially circulates through the first fluid circulation line 100a. FIG. 4 illustrates a state in which the first fluid does not substantially circulate and which is indicated by a dotted line in the first fluid circulation line 100a.

The $(2\text{-}2)^{th}$ fluid circulation operation may include allowing the second fluid to sequentially circulate in the hydrogen storage 220, the pump 210, and the thermal device 230 that heats or cools the second fluid through the second fluid circulation line 200a. As an example, the $(2\text{-}2)^{th}$ fluid circulation operation may be an operation in which the second fluid supplies the thermal energy to the hydrogen storage 220 without receiving the thermal energy from the first fluid, and thus the hydrogen is desorbed from the hydride in the hydrogen storage 220. Thus, in the $(2\text{-}2)^{th}$ fluid circulation operation, the thermal device 230 may be a heating member (for example, an electric heater) that heats the second fluid. However, unlike this, the $(2\text{-}2)^{th}$ fluid circulation operation may be an operation in which the second fluid recovers the thermal energy from the hydrogen storage 220, and thus the hydrogen is adsorbed to the metal or alloy in the hydrogen storage 220. The thermal device 230 may be a heat dissipation member (for example, a radiator) that cools the second fluid.

The fact that the hydrogen supply method according to the present disclosure may include the $(1\text{-}1)^{th}$ fluid circulation operation, the $(1\text{-}2)^{th}$ fluid circulation operation, the $(2\text{-}1)^{th}$ fluid circulation operation, and the $(2\text{-}2)^{th}$ fluid circulation operation does not mean a state in which the $(1\text{-}1)^{th}$ fluid circulation operation, the $(1\text{-}2)^{th}$ fluid circulation operation, the $(2\text{-}1)^{th}$ fluid circulation operation, and the $(2\text{-}2)^{th}$ fluid circulation operation are performed at the same time (i.e., synchronously). Rather, in an embodiment, at least some of the $(1\text{-}1)^{th}$ fluid circulation operation, the $(1\text{-}2)^{th}$ fluid circulation operation, the $(2\text{-}1)^{th}$ fluid circulation operation, and the $(2\text{-}2)^{th}$ fluid circulation operation may not be performed at the same time.

For example, the $(2\text{-}1)^{th}$ fluid circulation operation and the $(2\text{-}2)^{th}$ fluid circulation operation may be performed separately from each other in time series (i.e., asynchronously). This may be understood that the flow of the second fluid, which is indicated by a solid line, in the second fluid circulation line 200a in FIG. 3, and the flow of the second fluid, which is indicated by a solid line, in the second fluid circulation line 200a in FIG. 4 are selectively performed and may be understood that the second fluid discharged from the pump 210 and supplied to the second flow rate control member 240 is alternatively supplied to the thermal device 230 or the second heat exchanger 130 by the second flow rate control member 240.

In contrast, the $(2\text{-}1)^{th}$ fluid circulation operation and the $(2\text{-}2)^{th}$ fluid circulation operation may be performed while overlapping each other in time series. This may be understood that the flow of the second fluid, which is indicated by a solid line, in the second fluid circulation line 200a in FIG. 3, and the flow of the second fluid, which is indicated by a solid line, in the second fluid circulation line 200a in FIG. 4 are simultaneously performed and may be understood that the second fluid discharged from the pump 210 and supplied to the second flow rate control member 240 is simultaneously supplied to the thermal device 230 or the second heat exchanger 130 by the second flow rate control member 240.

According to the present disclosure, in the $(2\text{-}2)^{th}$ fluid circulation operation, the second fluid may be heated by the thermal device 230 and then flow into the hydrogen storage 220. As described above, this is for desorbing the hydrogen from the hydride without exchanging heat with the first fluid by supplying, to the hydrogen storage 220, the high-temperature second fluid heated by the heating member provided as the thermal device 230. On the other hand, in the $(2\text{-}2)^{th}$ fluid circulation operation, the second fluid may be cooled by the thermal device 230 and then also flow into the hydrogen storage 220. This is for smoothly adsorbing the hydrogen in the metal or alloy by cooling the second fluid without exchanging heat with the first fluid in the second heat exchanger 130 and then supplying the cooled second fluid to the hydrogen storage 220.

As described above, the hydrogen storage 220, a metal hydride, and the metal or alloy may be heated or cooled by the heat exchange with the second fluid supplied to the hydrogen storage 220. Thus, the hydrogen may be selectively adsorbed or desorbed in the hydrogen storage 220 by the heat exchange with the second fluid.

Figure 7:
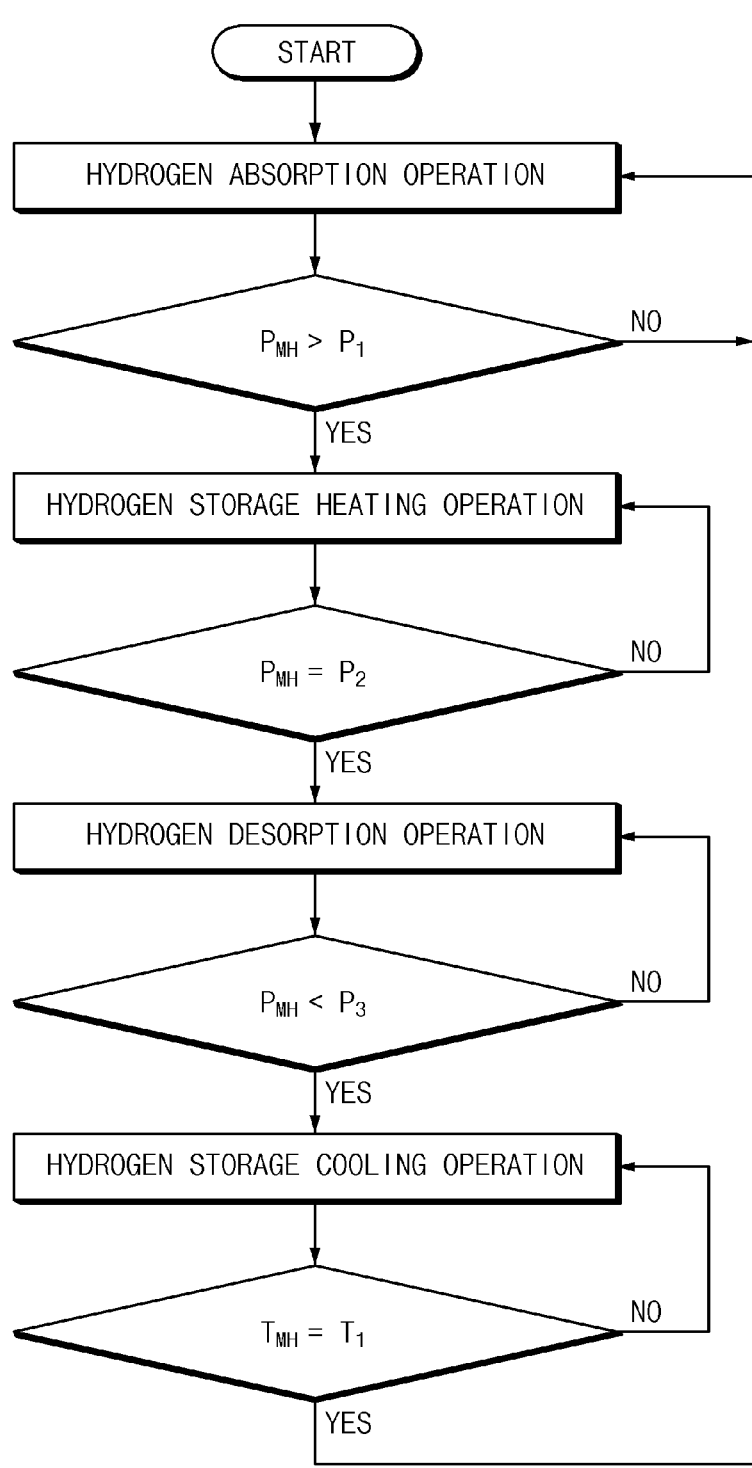
FIG. 7 is a flowchart illustrating a process of performing a hydrogen absorption operation, a hydrogen storage heating operation, a hydrogen desorption operation, and a hydrogen storage cooling operation of the hydrogen supply method according to the present disclosure.

FIG. 7 is a flowchart illustrating a process of performing a hydrogen absorption operation, a hydrogen storage heating operation, a hydrogen desorption operation, and a hydrogen storage cooling operation of the hydrogen supply method according to the present disclosure in time series (i.e., chronologically).

Referring to FIG. 7, the hydrogen supply method according to the present disclosure may further include a hydrogen absorption operation in which the second fluid flows into the hydrogen storage 220, cools the metal or alloy in the hydrogen storage 220, and thus absorbs the hydrogen to the metal or alloy in the hydrogen storage 220. In the hydrogen absorption operation, the second fluid flowing into the hydrogen storage 220, which is a fluid flowing by the $(2\text{-}1)^{th}$ fluid circulation operation described above, may be a fluid that is cooled while exchanging, by the second heat exchanger 130, heat with the first fluid flowing by the $(1\text{-}2)^{th}$ fluid circulation operation described above and then flows into the hydrogen storage 220 or a fluid that is cooled by the thermal device 230 in the $(2\text{-}2)^{th}$ fluid circulation operation.

Further, the hydrogen supply method according to the present disclosure may further include a hydrogen storage heating operation which is performed after the hydrogen absorption operation and in which the second fluid flows into the hydrogen storage 220 and heats the hydrogen storage 220. In the hydrogen storage heating operation, the second fluid flowing into the hydrogen storage 220, which is a fluid flowing by the $(2\text{-}1)^{th}$ fluid circulation operation described above, may be a fluid that is heated while exchanging, by the second heat exchanger 130, heat with the first fluid flowing by the $(1\text{-}1)^{th}$ fluid circulation operation described above and then flows into the hydrogen storage 220 or a fluid that is heated by the thermal device 230 in the $(2\text{-}2)^{th}$ fluid circulation operation.

Further, the hydrogen supply method according to the present disclosure may further include a hydrogen desorption operation which is performed after the hydrogen storage heating operation and in which the second fluid flows into the hydrogen storage 220, heats the hydride, and thus desorbs the hydrogen from the hydride in the hydrogen storage 220. In the hydrogen desorption operation, the second fluid flowing into the hydrogen storage 220, which is a fluid flowing by the $(2\text{-}1)^{th}$ fluid circulation operation described above, may be a fluid that is heated while exchanging, by the second heat exchanger 130, heat with the first fluid flowing by the $(1\text{-}1)^{th}$ fluid circulation operation described above and then flows into the hydrogen storage 220 or a fluid that is heated by the thermal device 230 in the $(2\text{-}2)^{th}$ fluid circulation operation.

Further, the hydrogen supply method according to the present disclosure may further include a hydrogen storage cooling operation which is performed after the hydrogen desorption operation and in which the second fluid flows into the hydrogen storage 220 and cools the hydrogen storage 220. In the hydrogen storage cooling operation, the second fluid flowing into the hydrogen storage 220, which is a fluid flowing by the (2-1)$^{th}$ fluid circulation operation described above, may be a fluid that is cooled while exchanging, by the second heat exchanger 130, heat with the first fluid flowing by the (1-2)$^{th}$ fluid circulation operation described above and then flows into the hydrogen storage 220 or a fluid that is cooled by the thermal device 230 in the (2-2)$^{th}$ fluid circulation operation.

The hydrogen absorption operation described above is performed again after the hydrogen storage cooling operation, and thus the hydrogen absorption operation, the hydrogen storage heating operation, the hydrogen desorption operation, and the hydrogen storage cooling operation may be performed cyclically.

As described above, in the (2-1)$^{th}$ fluid circulation operation, the second fluid may flow into the second heat exchanger 130 and thus exchange heat with the first fluid circulating through the (1-1)$^{th}$ fluid circulation operation or the (1-2)$^{th}$ fluid circulation operation. However, unlike the above description, in the (2-1)$^{th}$ fluid circulation operation, the second fluid may flow into the second heat exchanger 130 even in a state in which the first fluid does not circulate through the (1-1)$^{th}$ fluid circulation operation or the (1-2)$^{th}$ fluid circulation operation. According to the present disclosure, the (2-1)$^{th}$ fluid circulation operation may further include allowing the second fluid to flow into the second heat exchanger 130 in a state in which the circulation of the first fluid through the first fluid circulation line 100a is stopped as operation of the compressor 120 is stopped. The amount of thermal energy corresponding to the heat exchange between the second fluid and the first fluid by the second heat exchanger 130 may be smaller than the amount of thermal energy corresponding to the heat exchange between the second fluid and the first fluid in the second heat exchanger when the first fluid circulates in the first fluid circulation line 100a through the (1-1)$^{th}$ fluid circulation operation or the (1-2)$^{th}$ fluid circulation operation. However, as long as the first fluid is also present in the second heat exchanger 130, heat may be exchanged between the first fluid and the second fluid, and thus, in the above case, it is difficult to determine that the first fluid and the second fluid are thermally isolated from each other.

As an example, in the hydrogen absorption operation, the amount of hydrogen in the hydrogen storage may increase. This may be understood as a state in which, in the hydrogen absorption operation, the hydrogen is absorbed while the hydrogen is supplied from the outside into the hydrogen storage.

In the hydrogen storage heating operation performed after the hydrogen absorption operation, a temperature of the hydrogen storage may increase, and the amount of hydrogen in the hydrogen storage may be constant. This may be understood as a state in which, in the hydrogen storage heating operation, the hydrogen in the hydrogen storage is not discharged to the outside, and in contrast, the hydrogen is not supplied from the outside to the hydrogen storage. For example, the hydrogen storage heating operation may be understood as a process of increasing the temperatures of the hydrogen storage and the hydride in advance so that a temperature condition in which the hydrogen is smoothly desorbed is created in the subsequent hydrogen desorption operation.

Further, in the hydrogen desorption operation performed after the hydrogen storage heating operation, the amount of hydrogen in the hydrogen storage may decrease. This may be understood as a state in which, in the hydrogen desorption operation, the hydrogen in the hydrogen storage is discharged to the outside. In the hydrogen storage cooling operation performed after the hydrogen desorption operation, the temperature of the hydrogen storage may decrease, and the amount of hydrogen in the hydrogen storage may be constant. This may be understood as a state in which, in the hydrogen storage cooling operation, the hydrogen in the hydrogen storage is not discharged to the outside, and in contrast, the hydrogen is not supplied from the outside to the hydrogen storage. For example, the hydrogen storage cooling operation may be understood as a process of decreasing the temperatures of the hydrogen storage and the metal or alloy in advance so that a temperature condition in which the hydrogen is smoothly absorbed is created in the subsequent hydrogen absorption operation.

As illustrated in FIG. 7, according to the hydrogen supply method according to the present disclosure, in the hydrogen absorption operation, when the pressure PMH of the metal or alloy in the hydrogen storage 220 is higher than a predetermined value P1, the hydrogen absorption operation may be terminated, and the hydrogen storage heating operation may start. In the hydrogen storage heating operation, when the pressure PMH of the hydride in the hydrogen storage 220 reaches a predetermined value P2, the hydrogen storage heating operation may be terminated, and the hydrogen desorption operation may start. In the hydrogen desorption operation, when the pressure PMH of the hydride in the hydrogen storage 220 is lower than a predetermined value P3, the hydrogen desorption operation may be terminated, and the hydrogen storage cooling operation may start. In the hydrogen storage cooling operation, when the temperature TMH of the metal or alloy in the hydrogen storage 220 reaches a predetermined Ti, the hydrogen storage cooling operation may be terminated, and the hydrogen absorption operation may start again.

According to the present disclosure, a novel hydrogen storage system is provide that may replace a hydrogen storage system that directly compresses hydrogen.

As described above, although the present disclosure has been described with reference to the limited embodiments and drawings, the present disclosure is not limited thereto. It should be apparent that those having ordinary skill in the art to which the present disclosure belongs could derive various implementations without departing from the technical spirit of the present disclosure and the equivalents of the appended claims.

What is claimed is:

1. A hydrogen storage thermal management system comprising:
   a first fluid circulation device including a first fluid circulation line through which a first fluid circulates; and
   a second fluid circulation device including a second fluid circulation line through which a second fluid circulates,
   wherein the first fluid circulation device comprises:
   a first heat exchanger by which the first fluid and an external fluid exchange heat therebetween;
   a four-way valve connected to the first heat exchanger through the first fluid circulation line and configured to control flow of the first fluid;
   a compressor, connected to the four-way valve through the first fluid circulation line, configured to compress the first fluid;
   a second heat exchanger connected to the four-way valve through the first fluid circulation line;
   an expansion valve, connected to the second heat exchanger through the first fluid circulation line, configured to expand the first fluid, wherein the second fluid circulation line is connected to the second heat exchanger so that the first fluid and the second fluid exchange heat therebetween in the second heat exchanger, wherein the second fluid circulation device comprises:

a pump, connected to the second heat exchanger through the second fluid circulation line, configured to pump the second fluid;

a hydrogen storage connected to the second heat exchanger through the second fluid circulation line and including a metal or alloy that absorbs hydrogen;

a heating or a heat dissipation member provided on the second fluid circulation line and configured to heat or cool the second fluid; and a valve that is provided on a downstream region of the pump in the second fluid circulation line and to which the second fluid discharged from the pump is supplied and directly connected to the pump, the second heat exchanger and the heating or the heat dissipation member device respectively;

wherein the second fluid circulation line branches into an area connected to the second heat exchanger and an area connected to the heating or the heat dissipation member with respect to the valve, and branched the second fluid is connected to the hydrogen storage, and wherein the valve controls a flow rate of the second fluid supplied to the second heat exchanger and a flow rate of the second fluid supplied to the heating or the heat dissipation member.

2. The hydrogen storage thermal management system of claim 1, wherein a first side and a second side of the four-way valve are connected to the compressor through the first fluid circulation line, and the first fluid circulation device is provided such that the first fluid sequentially passes through the four-way valve, the compressor, the four-way valve, and the second heat exchanger or sequentially passes through the four-way valve, the compressor, the four-way valve, and the first heat exchanger.

3. The hydrogen storage thermal management system of claim 1, wherein the second fluid circulation device is provided such that the second fluid sequentially passes through the second heat exchanger, the hydrogen storage, and the pump.

4. The hydrogen storage thermal management system of claim 1, wherein the heating or the heat dissipation member is a heat dissipation member configured to cool the second fluid or a heating member configured to heat the second fluid.

5. A hydrogen storage thermal management method comprising:

a $(1\text{-}1)^{th}$ fluid circulation operation in which a first fluid sequentially circulates through a first fluid circulation line including a first heat exchanger, a four-way valve configured to control flow of the first fluid, a compressor, the four-way valve, a second heat exchanger, and an expansion valve;

a $(2\text{-}1)^{th}$ fluid circulation operation in which a second fluid circulates through a second fluid circulation line through which the second fluid circulates and exchanges heat with the first fluid in the second heat exchanger; and a $(2\text{-}2)^{th}$ fluid circulation operation in which the second fluid circulates through the second fluid circulation line and bypasses the second heat exchanger;

wherein the $(2\text{-}1)^{th}$ fluid circulation operation includes allowing the second fluid to sequentially circulate through the second heat exchanger, a hydrogen storage including a metal or alloy that absorbs hydrogen, and a pump through the second fluid circulation line, wherein the $(2\text{-}2)^{th}$ fluid circulation operation includes allowing the second fluid to sequentially circulate through the hydrogen storage, the pump, and a heating or a heat dissipation member configured to heat or cool the second fluid through the second fluid circulation line, wherein a valve that is provided on a downstream region of the pump in the second fluid circulation line and to which the second fluid discharged from the pump is supplied and directly connected to the pump, the second heat exchanger and the heating or the heat dissipation member respectively, wherein the second fluid circulation line branches into an area connected to the second heat exchanger and an area connected to the heating or the heat dissipation member with respect to the valve, and branched the second fluid is connected to the hydrogen storage, and wherein the valve controls a flow rate of the second fluid supplied to the second heat exchanger and a flow rate of the second fluid supplied to the heating or the heat dissipation member.

6. The hydrogen storage thermal management method of claim 5, wherein the $(2\text{-}1)^{th}$ fluid circulation operation further includes heating or cooling the second fluid discharged from the second heat exchanger in the heating or the dissipation member before flowing into the hydrogen storage.

7. The hydrogen storage thermal management method of claim 5, further comprising:

a $(1\text{-}2)^{th}$ fluid circulation operation in which the first fluid sequentially circulates through the first heat exchanger, the expansion valve, the second heat exchanger, the four-way valve, the compressor, and the four-way valve through the first fluid circulation line, wherein the $(1\text{-}1)^{th}$ fluid circulation operation and the $(1\text{-}2)^{th}$ fluid circulation operation are performed separately from each other in time series.

8. The hydrogen storage thermal management method of claim 5, wherein the $(2\text{-}1)^{th}$ fluid circulation operation and the $(2\text{-}2)^{th}$ fluid circulation operation are performed separately from each other in time series.

9. The hydrogen storage thermal management method of claim 5, wherein the $(2\text{-}1)^{th}$ fluid circulation operation and the $(2\text{-}2)^{th}$ fluid circulation operation are performed while overlapping each other in time series.

10. The hydrogen storage thermal management method of claim 5, further comprising:

a hydrogen absorption operation in which the second fluid flows into the hydrogen storage to cool the metal or alloy to absorb the hydrogen to the metal or alloy in the hydrogen storage to form a hydride; and a hydrogen storage heating operation that is performed after the hydrogen absorption operation and in which the second fluid flows into the hydrogen storage to heat the hydrogen storage.

11. The hydrogen storage thermal management method of claim 10, further comprising:

a hydrogen desorption operation that is performed after the hydrogen storage heating operation and in which the second fluid flows into the hydrogen storage to heat the hydride to desorb the hydrogen from the hydride in the hydrogen storage; and a hydrogen storage cooling operation that is performed after the hydrogen desorption operation and in which the second fluid flows into the hydrogen storage to cool the hydrogen storage.

12. The hydrogen storage thermal management method of claim 10, wherein, in the hydrogen absorption operation, the amount of the hydrogen in the hydrogen storage increases.

13. The hydrogen storage thermal management method of claim 10, wherein, in the hydrogen storage heating operation, a temperature of the hydrogen storage increases, and the amount of the hydrogen in the hydrogen storage is constant.

14. The hydrogen storage thermal management method of claim 11, wherein, in the hydrogen desorption operation, the amount of the hydrogen in the hydrogen storage decreases.

15. The hydrogen storage thermal management method of claim 11, wherein, in the hydrogen storage cooling operation, a temperature of the hydrogen storage decreases, and the amount of hydrogen in the hydrogen storage is constant.

16. The hydrogen storage thermal management method of claim 10, wherein, in the hydrogen absorption operation, the second fluid flowing into the hydrogen storage exchanges heat with the first fluid circulating in the $(1\text{-}2)^{th}$ fluid circulation operation in the second heat exchanger and then flows into the hydrogen storage, and in the hydrogen storage heating operation, the second fluid flowing into the hydrogen storage exchanges heat with the first fluid circulating in the $(1\text{-}1)^{th}$ fluid circulation operation in the second heat exchanger and then flows into the hydrogen storage.

17. The hydrogen storage thermal management method of claim 11, wherein, in the hydrogen desorption operation, the second fluid flowing into the hydrogen storage exchanges heat with the first fluid circulating in the $(1\text{-}1)^{th}$ fluid circulation operation in the second heat exchanger and then flows into the hydrogen storage, and in the hydrogen storage cooling operation, the second fluid flowing into the hydrogen storage exchanges heat with the first fluid circulating in the $(1\text{-}2)^{th}$ fluid circulation operation in the second heat exchanger and then flows into the hydrogen storage.

* * * * *